(12) United States Patent
Zhuo et al.

(10) Patent No.: US 10,705,932 B2
(45) Date of Patent: Jul. 7, 2020

(54) METHOD, DEVICE AND COMPUTER PROGRAM PRODUCT FOR MANAGING A STORAGE SYSTEM

(71) Applicant: EMC IP Holding Company LLC, Hopkinton, MA (US)

(72) Inventors: Baote Zhuo, Beijing (CN); Jamin Kang, Beijing (CN); Liam Xiongcheng Li, Beijing (CN); Changyu Feng, Beijing (CN); Hongpo Gao, Beijing (CN); Ree Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/167,716

(22) Filed: Oct. 23, 2018

(65) Prior Publication Data
US 2019/0129817 A1    May 2, 2019

(30) Foreign Application Priority Data
Oct. 27, 2017    (CN) .......................... 2017 1 1022156

(51) Int. Cl.
| | | |
|---|---|---|
| *G06N 20/00* | (2019.01) | |
| *G06F 11/07* | (2006.01) | |
| *G06F 11/20* | (2006.01) | |
| *G06F 11/16* | (2006.01) | |

(52) U.S. Cl.
CPC ...... *G06F 11/2094* (2013.01); *G06F 11/1666* (2013.01); *G06F 2201/85* (2013.01)

(58) Field of Classification Search
CPC ............ G06F 11/2094; G06F 11/1076; G06F 11/1092; G06F 11/1662; G06F 11/3055; G06F 11/0793; G06F 11/14; G06F 11/1666; G06F 3/0619; G06F 3/0614;
(Continued)

(56) References Cited

U.S. PATENT DOCUMENTS

| | | | |
|---|---|---|---|
| 6,912,629 B1 * | 6/2005 | West | ................... G06F 11/1456 711/161 |
| 7,516,348 B1 | 4/2009 | Ofer | |
| 7,865,761 B1 | 1/2011 | Chilton | |

(Continued)

*Primary Examiner* — Matthew M Kim
*Assistant Examiner* — Matthew N Putaraksa
(74) *Attorney, Agent, or Firm* — BainwoodHuang

(57) ABSTRACT

Embodiments of the present disclosure relate to a method, a device and a computer program product for managing a storage system. According to embodiments of the present disclosure, the method comprises, in response to a certain disk of a disk array of the storage system returning from a failed state to a normal state, determining information of a spare disk for recovering data on the storage disk, the first data being stored on the first disk. The method further comprises determining based at least in part on information of the spare disk, a disk from the spare disk and a first disk for reconstructing the disk array. According to embodiments of the present disclosure, in the case that the first disk is recovered from the failed state, the method comprises based on a data amount in the spare disk having not been recovered yet and a data amount associated with the first disk, selecting the spare disk or the first disk for data reconstruction. With the method according to embodiments of the present disclosure, the time for reconstructing a disk array will be reduced effectively.

23 Claims, 9 Drawing Sheets

(58) Field of Classification Search
CPC .............. H04L 67/1097; H04L 69/40; G11B 2220/2516; G11B 2220/415
See application file for complete search history.

(56) References Cited

U.S. PATENT DOCUMENTS

| | | |
|---|---|---|
| 7,971,021 B2 | 6/2011 | Daud et al. |
| 7,984,324 B2 | 7/2011 | Daud et al. |
| 8,782,465 B1 | 7/2014 | Foley et al. |
| 9,514,014 B2 * | 12/2016 | Webman ............. G06F 11/2094 |
| 10,013,321 B1 | 7/2018 | Stern |
| 10,498,821 B1 | 12/2019 | Bono et al. |
| 10,552,072 B1 | 2/2020 | Bono et al. |
| 2017/0192703 A1 * | 7/2017 | Zhang ..................... G06F 12/16 |

\* cited by examiner

| DISK 410-1 | DISK 410-2 | DISK 410-3 | DISK 410-4 | DISK 410-5 | SPARE DISK 420 |
|---|---|---|---|---|---|
| D00 | D01 | D02 | D03 | P0 | |
| D10 | D11 | D12 | D13 | P1 | |
| D20 | D21 | D22 | P2 | D23 | |
| D30 | D31 | D32 | P3 | D33 | |
| D40 | D41 | P4 | D42 | D43 | |
| D50 | D51 | P5 | D52 | D53 | |
| D60 | P6 | D61 | D62 | D63 | |
| D70 | P7 | D71 | D72 | D73 | |
| P8 | D80 | D81 | D82 | D83 | |
| P9 | D90 | D91 | D92 | D93 | |
| ... ... | ... ... | ... ... | ... ... | ... ... | |
| DN0 | DN1 | DN2 | DN3 | PN | |

| DISK 410-1 | DISK 410-2 | DISK 410-3 | DISK 410-4 | DISK 410-5 | SPARE DISK 420 |
|---|---|---|---|---|---|
| D00 | D01 | D02 | D03 | P0 | |
| D10 | D11 | D12 | D13 | P1 | |
| D20 | D21 | D22 | P2 | D23 | |
| D30 | D31 | D32 | P3 | D33 | |
| D40 | D41 | P4 | D42 | D43 | |
| D50 | D51 | P5 | D52 | D53 | |
| D60 | P6 | D61 | D62 | D63 | |
| D70 | P7 | D71 | D72 | D73 | |
| P8 | D80 | D81 | D82 | D83 | |
| P9 | D90 | D91 | D92 | D93 | |
| ... ... | ... ... | ... ... | ... ... | ... ... | |
| DN0 | DN1 | DN2 | DN3 | PN | |

FIG. 4D

METHOD, DEVICE AND COMPUTER PROGRAM PRODUCT FOR MANAGING A STORAGE SYSTEM

RELATED APPLICATIONS

This application claim priority from Chinese Patent Application Number CN 201711022156.X, filed on Oct. 27, 2017 at the State Intellectual Property Office, China, titled "METHOD, DEVICE AND COMPUTER PROGRAM PRODUCT FOR MANAGING A STORAGE SYSTEM" the contents of which is herein incorporated by reference in its entirety.

FIELD

Embodiments of the present disclosure generally relate to the field of data storage, and more specifically, to a method, a device and a computer program product for managing a storage system.

BACKGROUND

A storage system typically includes a plurality of storage disks, and these storage disks can be organized in a disk array. For example, a redundant array of independent disks (RAID) is a data storage virtualization storage technology that combines multiple storage disks into a single logic unit for the purpose of data redundancy backup and/or performance improvement. Taking a typical RAID 5 as an example, one disk array may correspond to a group of storage disks, and the RAID 5 uses the space of the group of storage disks for storing data and verifying information. In addition, there is often a spare disk for the disk array. Considering the consistency of input/output (I/O), the type of the spare disk is usually the same with the type of the storage disk in the disk array (for example, a disk). When a certain storage disk in the disk array fails, the spare disk can be used to temporarily replace the failed disk. In this case, the data on the failed disk will be recovered onto the spare disk for reconstructing the disk array.

In that case that the failed disk is a large-capacity disk, it takes much time to perform the reconstruction procedure for the disk array using a spare disk. Besides, when the storage disk fails, the disk array has a degraded operation performance. The above cases bring adverse effects to data safety and consistency of the disk array.

SUMMARY

The embodiments of the present disclosure provide a method, a device and a computer program product for managing a storage system.

In a first aspect of the present disclosure, it provides a method of managing a storage system. The method includes: in response to a first disk in a disk array of the storage system returning from a failed state to a normal state, determining information of a spare disk for recovering first data stored on the first disk; and determining, based at least in part on the information of the spare disk, a disk from the spare disk and the first disk for reconstructing the disk array.

In a second aspect of the present disclosure, it provides a device for managing a storage system. The device includes: at least one processing unit and at least one memory. The at least one memory is coupled to the at least one processing unit and stores instructions executable by the at least one processing unit. The instructions, when executed by the at least one processing unit, cause the device to execute acts comprising: in response to a first disk in a disk array of the storage system returning from a failed state to a normal state, determining information of a spare disk for recovering first data stored on the first disk; and determining, based at least in part on the information of the spare disk, a disk from the spare disk and the first disk for reconstructing the disk array.

In a third aspect of the present disclosure, it provides a computer program product. The computer program product is tangibly stored on a non-transitory computer readable medium and comprises machine executable instructions. The machine executable instructions, when executed by a device, cause the device to perform any step of the method according to the first aspect of the present disclosure.

This Summary is provided to introduce a selection of concepts in a simplified form and those concepts are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the exemplary embodiments of the present disclosure, the above and other objectives, features and advantages of exemplary embodiments of the present disclosure will become more apparent. Here in the exemplary embodiments of the present disclosure, the same reference symbols refer to the same elements.

FIGS. 4A-4D illustrate diagrams of a reconstruction procedure of a disk array according to embodiments of the present disclosure, respectively;

In each drawing, the same or similar reference symbols refer to the same or similar parts.

DETAILED DESCRIPTION OF EMBODIMENTS

Preferred embodiments of the present disclosure will be described in detail with reference to the drawings. Although the drawings illustrate the preferred embodiments of the present disclosure, it should be appreciated that various implementations of the present disclosure should not be limited by the embodiments illustrated herein. Rather, these embodiments are provided to describe the present disclosure more thoroughly and completely, and to convey the scope of the present disclosure fully to those skilled in the art.

As used herein, the term "comprises" and its variants are to be read as open-ended terms that mean "includes, but is not limited to." The term "or" is to be read as "and/or" unless the context clearly indicates otherwise. The term "based on" is to be read as "based at least in part on." The term "one exemplary embodiment" and "an embodiment" are to be read as "at least one exemplary embodiment." The term "another embodiment" is to be read as "at least one further embodiment." The terms "first," "second," and the like may refer to different or same objects. Other definitions, explicit and implicit, may be included below.

Figure 1:
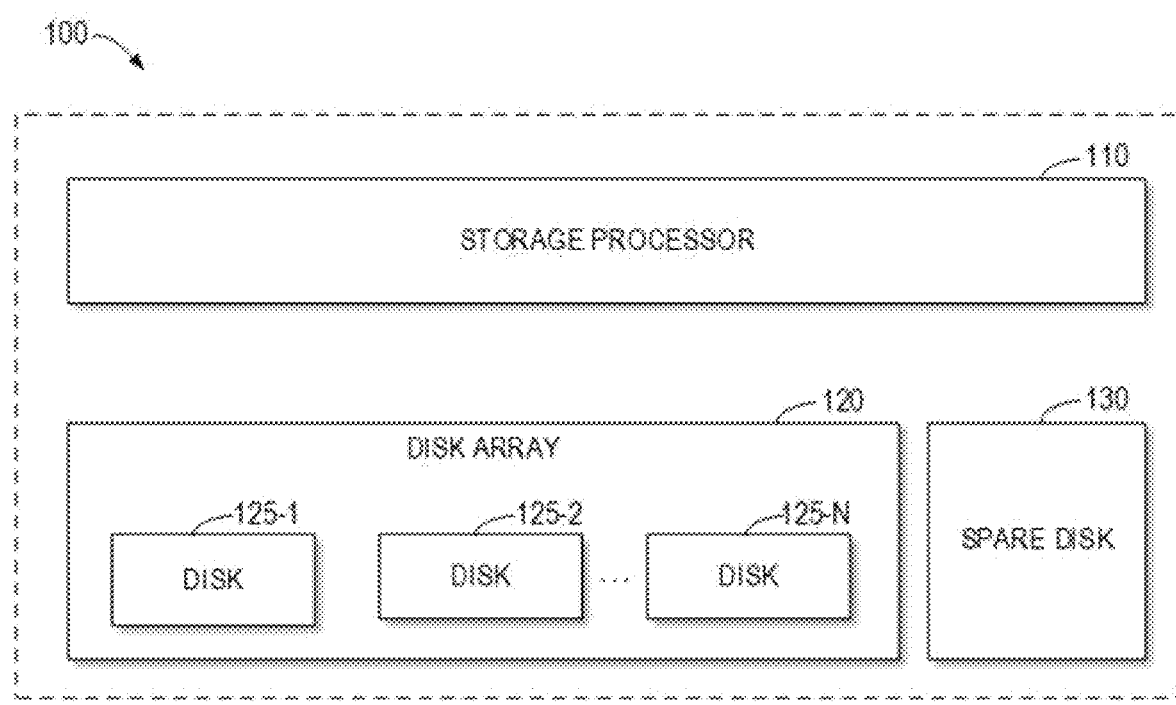
FIG. 1 illustrates a diagram of a storage system that can be used to implement embodiments of the present disclosure.

FIG. 1 illustrates an architecture diagram of a storage system 100 including a disk array. As shown in FIG. 1, the storage system 100 may include a storage processor 110, a disk array 120 and a spare disk 130. It would be appreciated that the structure and function of the storage system 100 as shown in FIG. 1 are only provided exemplarily, without implying any limitation to the scope of the present disclosure. Embodiments of the present disclosure may be embodied in different structures and/or functions.

The storage processor 110 may be provided for managing one or more storage disks. The "storage disk" described herein may refer to any nonvolatile storage medium currently known or to be developed in the future, such as a hard disk, a CD, a solid-state disk (SSD) or the like. For ease of description, a disk serves as an example of the storage disk herein. However, it would be appreciated that this is provided only for ease of description, without implying any limitation to the scope of the present disclosure.

The storage processor 110 may for example organize one or more storage disks into a disk array 120. The disk array 120 may include one or more disk array groups. As shown in FIG. 1, for example, the disk array 120 may include storage disks 125-1, 125-2 . . . 125-N (collectively referred to as a storage disk 125).

The disk array 120 may for example be a redundant array of independent disks (RAID), which organizes a plurality of storage disks into a logic storage unit for the purpose of redundancy backup and/or performance improvement. According to the required redundancy and performance level, RAID may have different levels, such as RAID 0, RAID 1 . . . RAID 5 and the like. The disk array 120 may be composed of a plurality of RAID stripes, and each RAID stripe may include a data section for storing data and a verification section for storing parity information. Taking the RAID 5 with a 4D+1P structure as an example, each RAID stripe may include four data sections and one verification section. As described herein, the RAID 5 with the 4D+1P structure serves as an example of the disk array 120. However, it would be appreciated that this is provided only for the ease of description, without implying any limitation to the scope of the present disclosure.

The storage system 100 may include one or more spare disks for the disk array 120. The storage processor 110 may organize these spare disks into a spare disk array for reconstructing a failed disk in the disk array 120. For ease of description, only one spare disk 130 is shown in the embodiment of FIG. 1, and it would be appreciated that this is only provided exemplarily, rather than restrictively. In other embodiments of the present disclosure, the storage system may include any suitable number of spare disks.

In some embodiments, when a failure occurs to a storage disk in the disk array 120, the storage processor 110 may allocate a corresponding spare logic storage unit on the spare disk 130, for reconstructing the failed storage disk. When a user adds a storage disk for replacing the failed disk to the storage system 100, the storage processor 110 may copy data in the spare logic storage unit onto the replacement disk and release the spare logic storage unit for possible subsequent data reconstruction.

As stated above, in a conventional disk array, when a certain storage disk in the disk array fails, the spare disk is used to replace the failed disk. All the data on the failed disk is reconstructed and written onto the spare disk to complete data reconstruction of the disk array.

Particularly, in a conventional solution, even though the failed storage disk returns to the normal state later, the storage processor will not use the storage disk for array reconstruction. It is worth noting that, for a large-capacity disk array, data reconstruction of the disk array using the spare disk is really time-consuming. Besides, in the procedure of reconstructing data using the spare disk, the performance of the disk array is significantly reduced, presenting potential risks for data safety of the disk array. Hence, the problem to be solved is how to reconstruct the disk array safely and efficiently.

In order to solve one or more of the above problem and other potential problems, the exemplary embodiments of the present disclosure provide a method of managing a storage system. In the embodiments of the present disclosure, in the case that a storage disk of the disk array 120 of the storage system returns from a failed state to a normal state, related information of a spare disk for recovering data on the storage disk is determined. Based on the information, one disk is selected from the spare disk 130 and the storage disk to reconstruct the disk array 120. In this manner, the disk array may be reconstructed safely and efficiently, and the performance of the storage system is effectively improved.

Figure 2:
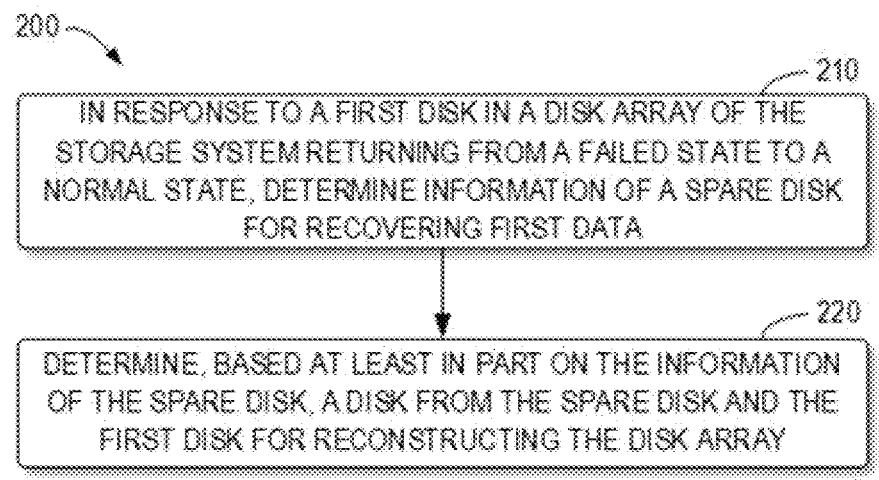
FIG. 2 illustrates a flowchart of a method of managing a storage system according to embodiments of the present disclosure.

The embodiments of the present disclosure will be described below with reference to FIG. 2. In general, FIG. 2 illustrates a flowchart of a method of managing a storage system according to embodiments of the present disclosure. Typically, the method may be implemented on the storage processor 110 of the storage system 100 as shown in FIG. 1, to manage the data storage and data reconstruction procedure of the disk array 120. In particular, the method 200 may be implemented at other components or devices. The method 200 may include additional acts not shown and/or may omit shown acts, and the scope of the present disclosure is not limited in this aspect. Without loss of generality, it is assumed that a failure occurs to a certain disk in the disk array 120 of the storage system 100, for example a failure occurs to the disk 125-1 (referred to as "a first disk"), i.e., the first disk 125-1 is in a failed state. In this case, the storage processor 110 may reconstruct data for the disk array 120 using the spare disk 130. During data reconstruction of the disk array 120 using the spare disk 130, the first disk 125-1 may return from the failed state to the normal state.

In block 210, in response to the first disk 125-1 in the disk array 120 of the storage system 100 returning from the failed state to the normal state, the storage processor 110 determines information of the spare disk 130 for recovering data (referred to as "first data"). The first data is the data stored on the first disk 125-1, i.e. the data to be recovered by performing data reconstruction of the disk array 120 using the spare disk.

In some embodiments of the present disclosure, the information of the spare disk 130 indicates the state information of performing data reconstruction of the disk array 120 using the spare disk 130. In some examples, the information may include a data amount of the first data that has been recovered by the spare disk 130. Moreover, the information may include a data amount of the first data that is not recovered by the spare disk 130. In addition, the information may include a proportion of the data that has been recovered by the spare disk 130 to the first data, and the proportion indicates a percentage of the data that has been recovered by the spare disk 130 to a total data amount to be recovered on the first disk 125-1. Further, the information may include a proportion of the data that is not recovered by the spare disk 130 to the first data, and the proportion indicates a percentage of the data that is not recovered by the spare disk 130 to a total data amount to be recovered on the first disk 125-1. In some examples, the information may also include a disk type of the spare disk 130, which includes but is not limited to, a solid-state disk (SSD), a serial attached small computer system interface (SAS), a near line SAS (NL-SAS) and the like.

In block 220, the storage processor 110 determines, based at least in part on the information of the spare disk 130, a disk from the spare disk 130 and the first disk 125-1 for reconstructing the disk array 120. In some embodiments of the present disclosure, the disk for reconstructing the disk array 120 may be determined by comparing the data amount of the first data that is not recovered by the spare disk 130 with a threshold (referred to as "a first threshold data amount").

In some embodiments, in the case that the data amount of the first data that is not recovered by the spare disk 130 exceeds the first threshold data amount, the storage processor 110 may reconstruct the disk array 120 using the first disk 125-1. For example, this case might correspond to an early stage of reconstructing the disk array 120 using the spare disk 130. At this stage, when the first disk 125-1 is recovered to the normal state, the storage processor 110 may perform data reconstruction of the disk array 120 by directly using the first disk 125-1, so as to save reconstruction time of the disk array.

In addition or alternatively, in some embodiments, in the case that the data amount of the first data that is not recovered by the spare disk 130 is less than the first threshold data amount, the storage processor 110 reconstructs the disk array 120 using the spare disk 130. For example, this case may correspond to the case where the reconstruction of the disk array 120 using the spare disk 130 is about to finish. Therefore, in this case, even though the first disk 125-1 is recovered from the failed state to the normal state, the storage processor 110 will not use the first disk 125-1 to perform the data reconstruction. It is worth noting that, in this case, it saves reconstruction time of disk array to perform data reconstruction using the spare disk 130, as compared to using the first disk 125-1.

In some embodiments of the present disclosure, the storage processor 110 may also determine whether the data reconstruction of the disk array 120 should be performed using the spare disk 130 or the first disk 125-1, based on the proportion of the data that is not recovered by the spare disk 130 to the first data. For example, in the case that the proportion of the data that is not recovered by the spare disk 130 to the first data is higher than a certain threshold proportion, the storage processor 110 performs data reconstruction using the first disk 125-1. For example, in the case that the proportion of the data that is not recovered by the spare disk 130 to the first data is lower than a certain threshold proportion, the data reconstruction is still performed using the spare disk. As an example, the threshold proportion may be predetermined through historical experience of the storage system. As a further example, the threshold proportion may be determined based on the type of the spare disk 130 or a specific storage application scenario.

In some embodiments, a disk for reconstructing the disk array 120 may be determined by determining a disk type of the spare disk 130 for reconstructing the disk array 120. In some examples, in the case that the disk type of the spare disk 130 belongs to certain predetermined disk types, the storage processor 110 determines that the data reconstruction should still be performed using the spare disk 130. In some examples, the disk type may at least include a storage capacity and a reading and writing speed of the spare disk 130. For example, for certain predetermined types of spare disks with a fast reading and writing speed, it may simplify the data reconstruction procedure and save data reconstruction time by selecting and using these types for performing data reconstruction of the disk array 120.

In some embodiments of the present disclosure, the storage processor 110 may also obtain a data amount associated with the first disk 125-1 in a period from the first disk 125-1 entering the failed state to returning to the normal state, and compare the data amount associated with the first disk 125-1 with the data amount that is not recovered by the spare disk 130, so as to select a disk from the spare disk 130 and the first disk 125-1 to perform data reconstruction of the disk array 120. In some examples, the storage processor 110 records information of data (referred to as "second data") written into the disk array 120 in the period from the first disk 125-1 entering the failed state to returning to the normal state. As an example, the information may at least include at least one of the following: a storage address of the data associated with the first disk 125-1 in the second data written into the disk array 120, a data amount of the second data, a data amount therein associated with the first disk 125-1, and the like. In some examples, the storage processor 110 may determine the data amount associated with the first disk 125-1 based on the information associated with the second data.

According to embodiments of the present disclosure, if the difference between the data amount of the first data that is not recovered by the spare disk 130 and the data amount associated with the first disk 125-1 exceeds a certain threshold (referred to as "a second threshold") data amount, the storage processor 110 may perform data reconstruction using the first disk 125-1.

Alternatively or in addition, if the difference between the data amount of the first data that is not recovered by the spare disk 130 and the data amount associated with the first disk 125-1 is less than the second threshold data amount, it means that the spare disk 130 may complete the data reconstruction shortly, and the storage processor 110 thus may perform the data reconstruction using the spare disk 130. In this case, even though the first disk 125-1 returns from the failed state to the normal state, the storage processor 110 will not use the first disk 125-1 to perform the data reconstruction of the disk array 120. Hence, in addition, the storage processor 110 may cease recording information related to the second data in order to reduce occupancy of processing and storing resources. In some examples, since different types of spare disks 130 have different reconstruction speeds, the second threshold may be determined based on types of different disks 130, so as to determine whether it is more reasonable to perform the data reconstruction using the spare disk 130 or the first disk 125-1.

A specific example will be described below, in which the storage processor 110 may determine one disk from the spare disk 130 and the first disk 125-1 based on the following formula, in order to perform the data reconstruction of the disk array 120:

$$\frac{R-W}{1024} * \frac{1}{N} \leq 1 \tag{1}$$

where R represents the data amount (e.g. in MB) of the first data that is not recovered by the spare disk 130, W represents a data amount (e.g. in MB) associated with the first disk 125-1, and N is associated with the second threshold data amount (e.g. in GB). In some examples, the parameter N may be determined based on different disk types. For example, for an SSD disk, N may be set to 1024; for an SAS disk, N may be set to 512; and for an NL-SAS disk, N may be set to 128.

In an embodiment, if the formula (1) stands, the storage processor 110 may determine that the spare disk 130 is used for data reconstruction of the disk array. In a further example, if the above formula (1) stands, the storage processor 110 may cease recording the information related with the second data. In a still further example, if the formula (1) does not stand, the storage processor 110 may determine that the first disk 125-1 is used for data reconstruction of the disk array 120.

In the embodiment of the present disclosure as shown in FIG. 2, in the case that a certain storage disk returns from the failed state to the normal state, the storage processor 110 selects one disk from the storage disk and the spare disk 130 for reconstructing data of the disk array 120, based on the storage disk and information associated with the spare disk 130 for recovering the disk array 120. In some embodiments of the present disclosure, the storage processor 110 may perform data reconstruction using the storage disk recovered to the normal state, in order to avoid a downgraded operation state of the disk array caused by the data reconstruction performed using the spare disk. In some examples, in the case that the difference between the data amount that is not recovered by the spare disk 130 and the data amount associated with the storage disk exceeds a certain threshold data amount, the storage processor 110 may perform data reconstruction using the storage disk, in order to reduce the reconstruction time of the disk array 120.

Figure 3:
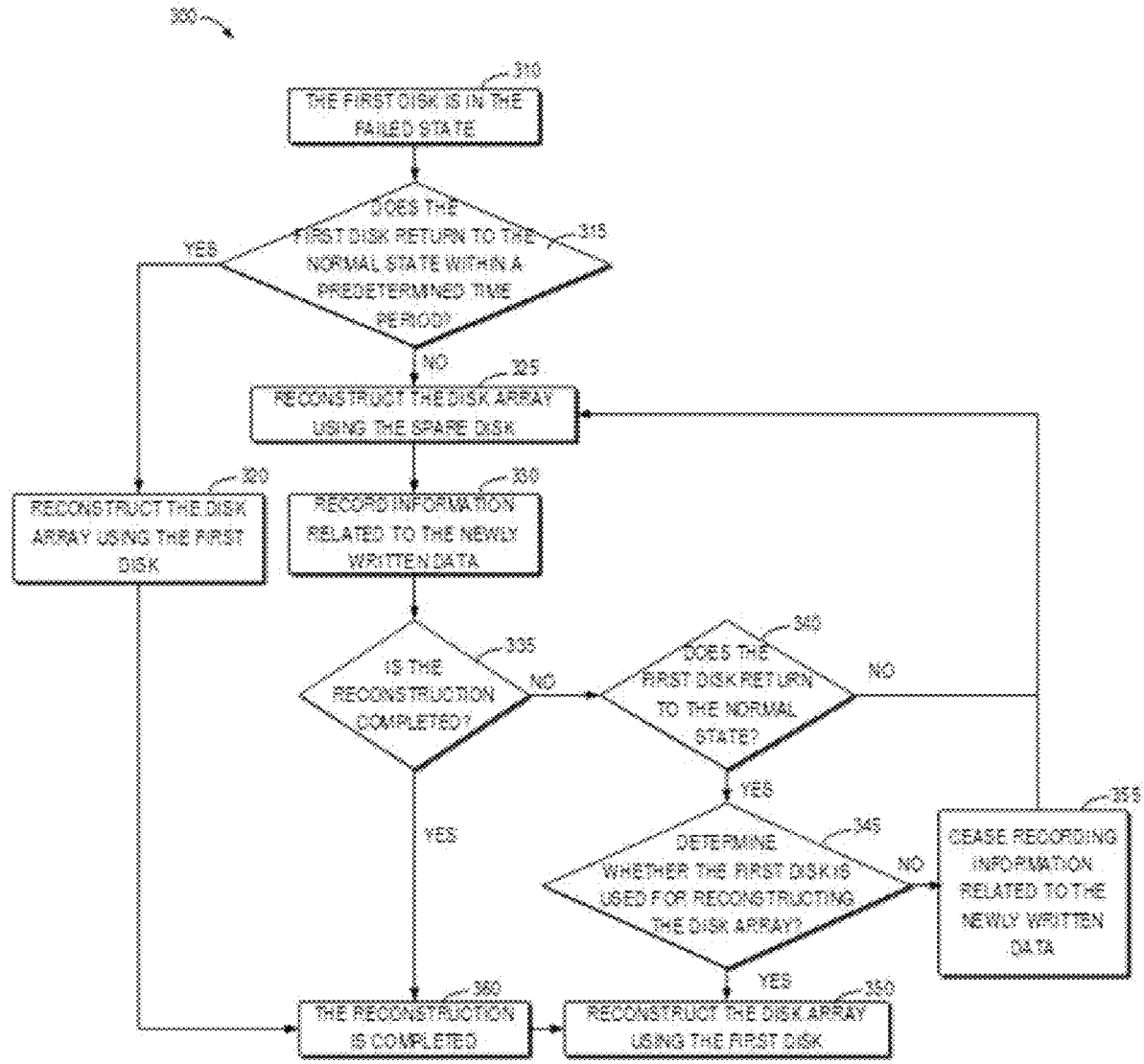
FIG. 3 illustrates a flowchart of an exemplary method of managing a storage system according to embodiments of the present disclosure.

FIG. 3 illustrates a flowchart of an exemplary method 300 of managing a storage system according to embodiments of the present disclosure. The method 300 may be implemented on the storage processor 110 of the storage system 100 as shown in FIG. 1, and the method may also be implemented at other components or devices. The method 300 is only provided for implementing the exemplary method according to embodiments of the present disclosure. Without loss of generality, the method 300 may also include additional acts not shown and/or may omit the acts shown therein, and the scope of the present disclosure is not limited in this regard.

In block 310, the storage processor 110 determines that the first disk 125-1 in the disk array 120 is in the failed state. For example, the first disk 125-1 might enter the failed state due to temporary interruption of power supply or a disoperation of an operator. In addition, in block 315, the storage processor 110 determines whether the first disk 125-1 returns to the normal state within a predetermined period. For example, the predetermined period may be 5 minutes.

It is worth noting that the numerical value used therein is only exemplary, without implying any limitation to the protection scope of the present disclosure. Without loss of generality, the predetermined period with other numerical values may be also used. If the first disk 125-1 returns to the normal state in the predetermined period, the storage processor 110 performs the data reconstruction of the disk array 120 using the first disk 125-1, in block 320. If the first disk 125-1 does not return to the normal state in the predetermined period, the storage processor 110 performs the data reconstruction of the disk array 120 using the spare disk 130 in block 325.

According to embodiments of the present disclosure, in the case that the first disk 125-1 is recovered from the failed state to the normal state, the storage processor 110 may use the first disk 125-1 for data reconstruction. Therefore, in block 330, the storage processor 110 may record information associated with the data newly written into the disk array 120 in the period when the first disk 125-1 returns from the failed state to the normal state, and the information for example may indicate new data I/O that the user or other application programs write to a logic address of the first disk 125-1 and other disks in the disk array 120. In block 335, the storage processor 110 determines whether the reconstruction procedure of the disk array 120 performed using the spare disk 130 is completed. If the data reconstruction procedure is not completed, the storage processor 110 determines in block 340 whether the first disk 125-1 returns to the normal state. If the first disk 125-1 returns from the failed state to the normal state, the storage processor 110 determines in block 345 whether the first disk 125-1 may be used for reconstructing the disk array. Reference may be made to the embodiments described above with regards to the detailed method of the determination, which is omitted for simplicity.

If the storage processor 110 determines that the first disk 125-1 may be used for reconstruction, the storage processor 110 uses the first disk 125-1 for data reconstruction in block 350. Otherwise, in block 355, the storage processor 110 ceases recording information related to the newly written data, and the storage processor 110 continues using the spare disk 130 for reconstruction. In block 360, the reconstruction of the disk array is completed.

FIGS. 4A-4D illustrate diagrams of reconstruction procedures of a disk array, respectively. In the description provided herein, RAID 5 is used as an example of the disk array 120. However, it would be appreciated that this is only for ease of description, without implying any limitation to the scope of the present disclosure.

FIG. 4A illustrates a disk array 120 of the RAID 5. The disk array 120 includes 5 disks, namely a disk 410-1, a disk 410-2 . . . and a disk 410-5. Each stripe in RG 110 (i.e., a row in the disk array 120) may for example include 4 data sections and 1 verification section (hereinafter referred to as RAID 5 of "4D+1P"). The "data section" described herein refers to a section storing user data D00, D01 . . . DN3, and the "verification section" refers to a section storing parity information P0, P1 . . . PN. Moreover, there is a spare disk 420 storing the disk array 120, which serves in the reconstruction of a failed disk in the disk array 120.

Figure 4B:
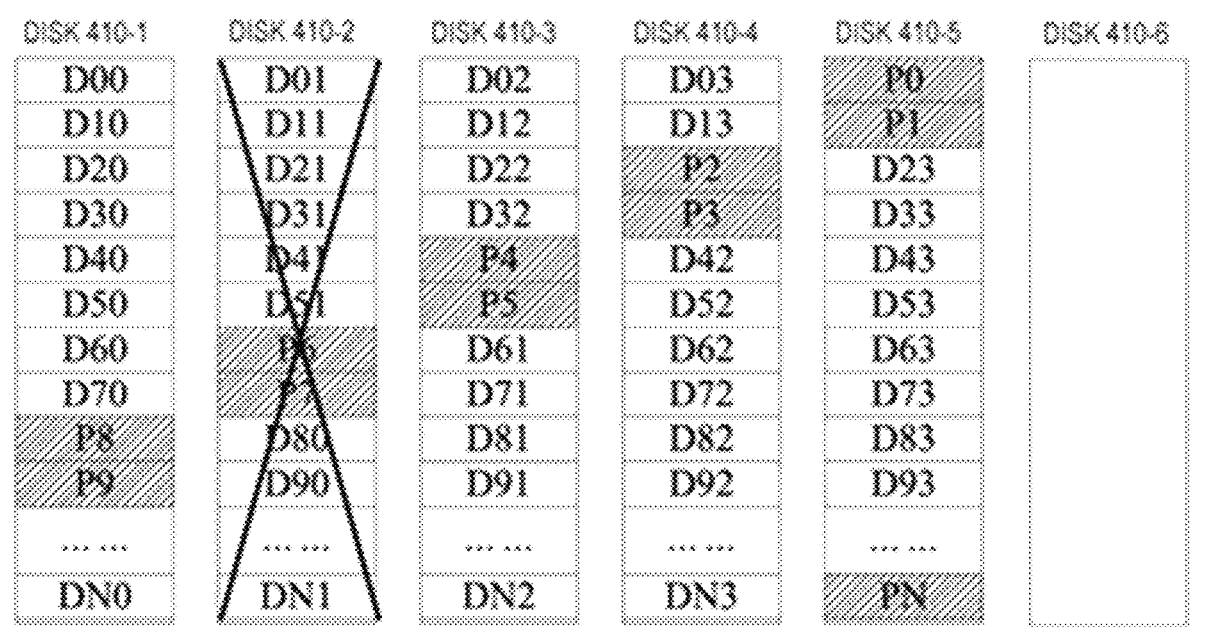
Figure 4C:
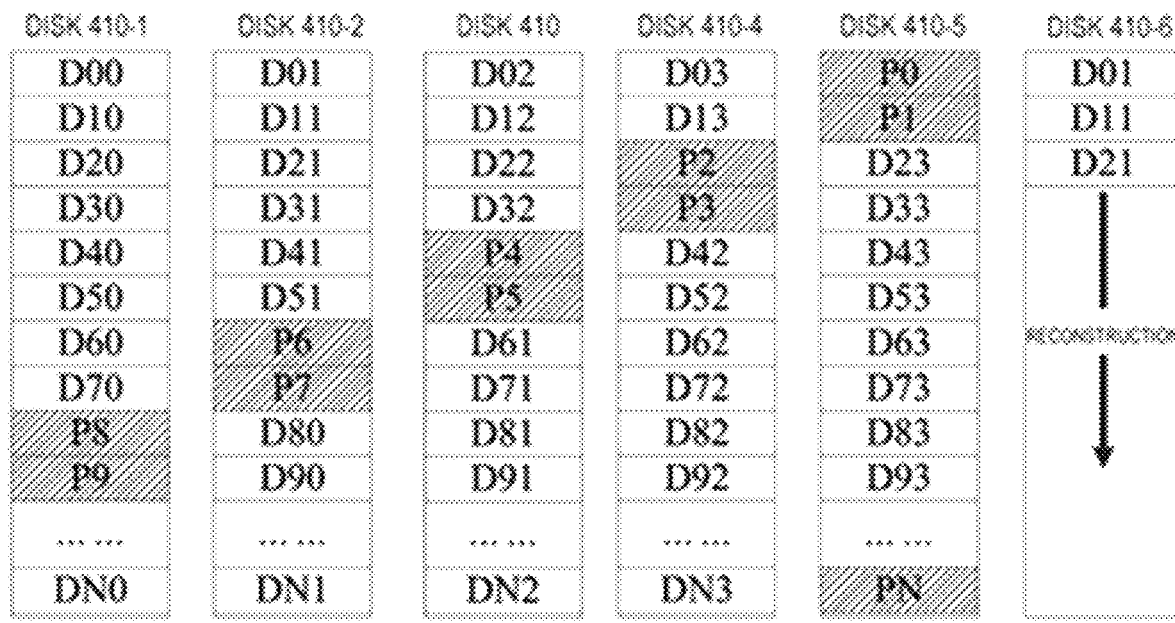

In FIG. 4A, one disk in the disk array 120, for example the disk 410-2, is in the failed state. As shown in FIG. 4B, the storage processor 110 takes the spare disk 420 as a new disk of the disk array 120, i.e., the disk 410-6, for recovering data on the disk 410-2 in the failed state. As shown in FIG. 4C, the storage processor 110 reconstructs data of the failed disk 410-2 on a new disk 410-6. During the period of performing data reconstruction of the disk array 120 using the new disk 410-6, it is assumed that the disk 410-2 returns from the failed state to the normal state. As discussed above, in this case, the storage processor 110 determines a disk from the disk 410-2 and the disk 410-6 to perform data reconstruction of the disk array 120. Reference may be made to the embodiments described above with regards to the detailed method of the determination, which is omitted for simplicity. Without loss of generality, FIG. 4D illustrates the case of performing data reconstruction using the original disk 410-2. As shown in FIG. 4, the storage processor 110 releases a storage space on the disk 410-6 for storing recovered data, and relabels the disk 410-6 as the spare disk 420. During the period of performing data reconstruction using the disk 410-2, the storage processor 110 reconstructs on the disk 410-2 the data associated with the disk 410-2 during the period when the disk 410-2 returns from the failed state to the normal state, for example, the new data I/O newly written into the logic address of the disk 410-2 (for example, the section D11 and the section D21 shown in FIG. 4D), in order to maintain data consistency of the disk array 120.

Figure 5:
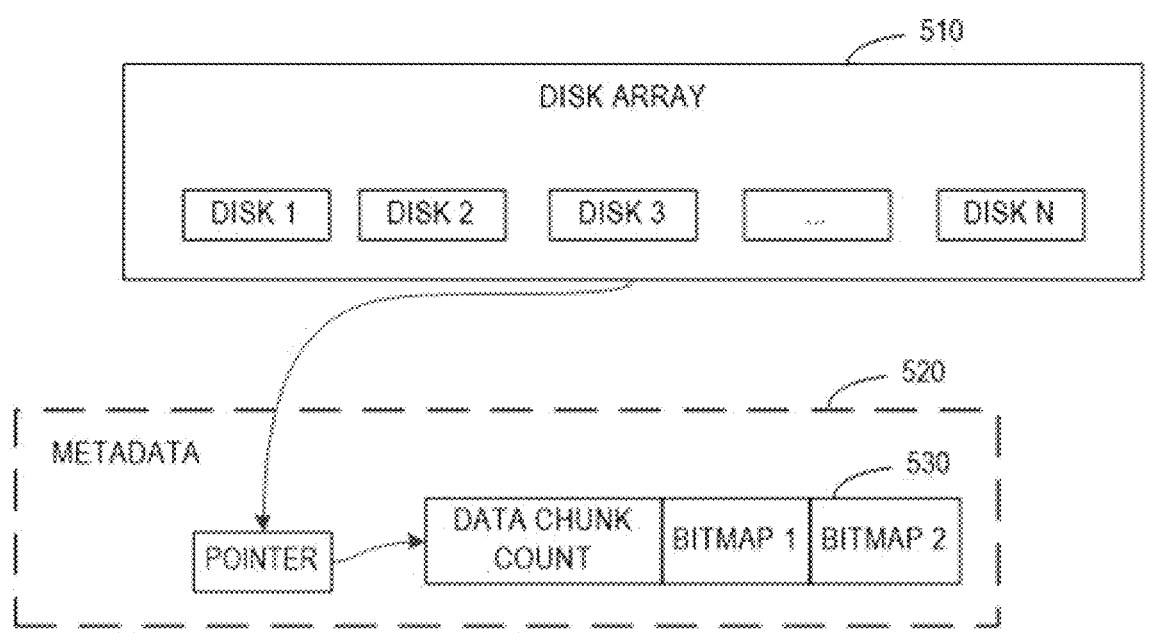
FIG. 5 illustrates a diagram of exemplary metadata for identifying the state of a disk array according to embodiments of the present disclosure.

FIG. 5 illustrates a diagram of an exemplary metadata for identifying the state of a disk array according to embodiments of the present disclosure. According to the embodiments of the present disclosure, various information and elements for implementing the foregoing method may be represented in the form of metadata, for example the form of metadata as shown in FIG. 5. As shown in FIG. 5, the metadata 520 indicates information related to a method of reconstructing a disk array 510 described for implementing embodiments of the present disclosure. By way of example, the disk array 510 may include a disk 1, a disk 2 . . . and a disk N. The metadata 520 may for example include storage configuration information, disk state information and the like of the disk array 510. As a further example, the metadata may be non-paged metadata.

As an example, a pointer in the metadata 520 indicates a data table 530 associated with the disk array 510. The data table 530 may for example include at least information such as a data chunk count, a bitmap 1, a bitmap 2 and the like. As a further example, the data chunk count may indicate a count of data associated with a storage disk and written into the disk array during a period when the storage disk returns from the failed state to the normal state, in order to implement the determination of the difference value between a data amount of the first data that is not recovered by the spare disk and a data amount associated with the first disk 125-1, as described by embodiments of the present disclosure. As a further example, the bitmap 1 indicates a certain disk from a disk 1, a disk 2 . . . and a disk N in the disk array 510 is in the failed state. As a still further example, a bit in the bitmap 2 indicates that new data I/O cannot be written to a logic address corresponding to a certain disk from a disk 1, a disk 2 . . . and a disk N in the disk array 510. According to the foregoing bitmap 1 and bitmap 2, it is convenient to determine information of the failed disk and the usage of the spare disk, and thus it is convenient to implement the method described in the embodiments of the present disclosure.

It would be appreciated that the metadata shown in FIG. 5 is only exemplary metadata information for implementing the exemplary method of the present disclosure. In the process of implementing the exemplary method of the present disclosure, those skilled in the art may define and use various types of metadata according to actual needs. In particular, the scope of the present disclosure is not limited in this regard.

Figure 6:
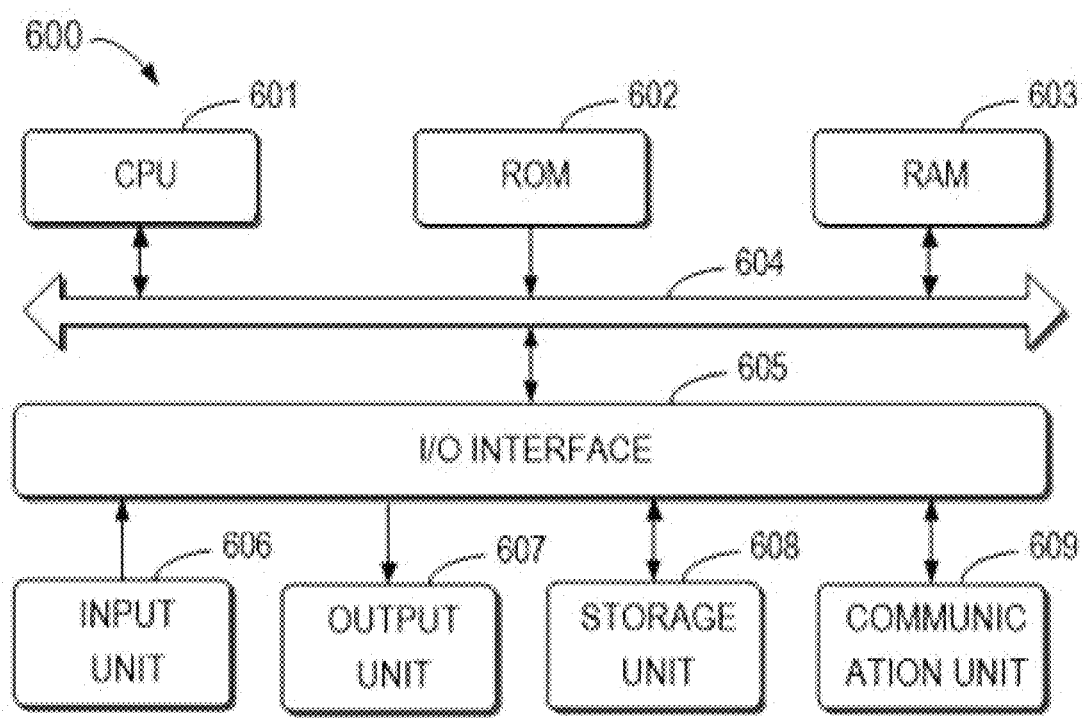
FIG. 6 illustrates a diagram of an exemplary device that can be used to implement the embodiments of the present disclosure.

FIG. 6 illustrates a block diagram of an exemplary device 600 that may be used to implement embodiments of the present disclosure. For example, the storage processor 310 shown in FIG. 3 may be implemented by the device 600. As shown in FIG. 6, the device 600 includes a central processing unit (CPU) 601 that may perform various suitable acts and processing based on computer program instructions stored in a read-only memory (ROM) 602 or computer program instructions loaded from a storage unit 608 to a random access memory (RAM) 603. Various programs and data required for the operations of the device 600 may also be stored in the RAM 603. The CPU 601, ROM 602 and RAM 603 are connected to each other via a bus 604. An I/O interface 605 is also connected to the bus 604.

A plurality of components in the device 600 are connected to the I/O interface 605, including an input unit 606, such as a keyboard, a mouse, etc.; an output unit 607, such as various kinds of displays and a loudspeaker, etc.; a storage unit 608, such as a magnetic disk, an optical disk, and etc.; a communication unit 609, such as a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 200 and/or 300, may be executed by the processing unit 601. For example, in some embodiments, the method 200 and/or 300 may be implemented as computer software programs tangibly embodied on a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more acts of the method 200 and/or 300 as described above may be executed.

The present disclosure may be a method, an apparatus, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting ata, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be appreciated that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
    in response to a first disk in a disk array of the storage system returning from a failed state to a normal state, determining information of a spare disk for recovering first data stored on the first disk; and
    determining, based at least in part on the information of the spare disk, a disk from the spare disk and the first disk for reconstructing the disk array;
wherein determining, based at least in part on the information of the spare disk, a disk from the spare disk and the first disk for reconstructing the disk array comprises:
    in response to a data amount of the first data that is not recovered by the spare disk exceeding a first threshold data amount, reconstructing the disk array using the first disk; and
    in response to a data amount of the first data that is not recovered by the spare disk being smaller than the first threshold data amount, reconstructing the disk array using the spare disk.

2. The method according to claim 1, wherein determining information of the spare disk for recovering data associated with the first disk comprises: determining at least one of the following:
    a data amount of the first data that has been recovered by the spare disk;
    a data amount of the first data that is not recovered by the spare disk;
    a proportion of data that has been recovered by the spare disk to the first data;
    a proportion of data that is not recovered by the spare disk to the first data; and
    a disk type of the spare disk.

3. The method according to claim 1, further comprising:
recording information related to second data, the second data being data written into the disk array during a period from the first disk entering the failed state to returning to the normal state.

4. The method according to claim 1, wherein the data amount of the first data that is not recovered by the spare disk exceeds the first threshold data amount; and
wherein the method further comprises:
labeling the spare disk as a new disk of the disk array;
prior to reconstructing the disk array using the first disk, recovering a portion of the first data in storage space of the new disk;
in response to reconstructing the disk array using the first disk, releasing the storage space of the new disk; and
relabeling the new disk as the spare disk.

5. A method of managing a storage system, comprising:
in response to a first disk in a disk array of the storage system returning from a failed state to a normal state, determining information of a spare disk for recovering first data stored on the first disk;
determining, based at least in part on the information of the spare disk, a disk from the spare disk and the first disk for reconstructing the disk array; and
recording information related to second data, the second data being data written into the disk array during a period from the first disk entering the failed state to returning to the normal state;
wherein determining, based at least in part on the information of the spare disk, the disk from the spare disk and the first disk for reconstructing the disk array comprises:
determining a data amount associated with the first disk from the information related to the second data;
determining a difference value between a data amount of the first data that is not recovered by the spare disk and a data amount associated with the first disk;
in response to the difference value being greater than a second threshold data amount, reconstructing the disk array using the first disk; and
in response to the difference value being smaller than the second threshold data amount, reconstructing the disk array using the spare disk.

6. The method according to claim 5, wherein determining, based at least in part on the information of the spare disk, a disk from the spare disk and the first disk for reconstructing the disk array comprises:
in response to a data amount of the first data that is not recovered by the spare disk exceeding a first threshold data amount, reconstructing the disk array using the first disk; and
in response to a data amount of the first data that is not recovered by the spare disk being smaller than the first threshold data amount, reconstructing the disk array using the spare disk.

7. The method according to claim 5, wherein in response to the difference value being greater than the second threshold data amount, reconstructing the disk array using the spare disk further comprises:
ceasing recording of information related to the second data.

8. The method according to claim 5, wherein the second threshold data amount is determined based at least in part on a disk type of the disk array.

9. A device for managing a storage system, the device comprising:
at least one processing unit; and
at least one memory coupled to the at least one processing unit and storing instructions executable by the at least one processing unit, the instructions, when executed by the at least one processing unit, causing the device to perform acts comprising:
in response to a first disk in a disk array of the storage system returning from a failed state to a normal state, determining information of a spare disk for recovering first data stored on the first disk; and
determining, based at least in part on the information of the spare disk, a disk from the spare disk and the first disk for reconstructing the disk array;
wherein determining, based at least in part on the information of the spare disk, a disk from the spare disk and the first disk for reconstructing the disk array comprises:
in response to a data amount of the first data that is not recovered by the spare disk exceeding a first threshold data amount, reconstructing the disk array using the first disk; and
in response to a data amount of the first data that is not recovered by the spare disk being smaller than the first threshold data amount, reconstructing the disk array using the spare disk.

10. The device according to claim 9, wherein determining information of the spare disk for recovering data associated with the first disk comprises: determining at least one of the following:
a data amount of the first data that has been recovered by the spare disk;
a data amount of the first data that is not recovered by the spare disk;
a proportion of data that has been recovered by the spare disk to the first data;
a proportion of data that is not recovered by the spare disk to the first data; and
a disk type of the spare disk.

11. The device according to claim 9, wherein the acts further comprise:
recording information related to second data, the second data being data written into the disk array during a period from the first disk entering the failed state to returning to the normal state.

12. The device according to claim 9, wherein the data amount of the first data that is not recovered by the spare disk exceeds the first threshold data amount; and
wherein the acts further comprise:
labeling the spare disk as a new disk of the disk array;
prior to reconstructing the disk array using the first disk, recovering a portion of the first data in storage space of the new disk;
in response to reconstructing the disk array using the first disk, releasing the storage space of the new disk; and
relabeling the new disk as the spare disk.

13. A device for managing a storage system, the device comprising:
at least one processing unit; and
at least one memory coupled to the at least one processing unit and storing instructions executable by the at least one processing unit, the instructions, when executed by the at least one processing unit, causing the device to perform acts comprising:
in response to a first disk in a disk array of the storage system returning from a failed state to a normal state, determining information of a spare disk for recovering first data stored on the first disk;

determining, based at least in part on the information of the spare disk, a disk from the spare disk and the first disk for reconstructing the disk array; and recording information related to second data, the second data being data written into the disk array during a period from the first disk entering the failed state to returning to the normal state;

wherein determining, based at least in part on the information of the spare disk, the disk from the spare disk and the first disk for reconstructing the disk array comprises:

determining a data amount associated with the first disk from information related to the second data;

determining a difference value between a data amount of the first data that is not recovered by the spare disk and a data amount associated with the first disk;

in response to the difference value being greater than a second threshold data amount, reconstructing the disk array using the first disk; and in response to the difference value being smaller than the second threshold data amount, reconstructing the disk array using the spare disk.

14. The device according to claim 13, wherein determining, based at least in part on the information of the spare disk, a disk from the spare disk and the first disk for reconstructing the disk array comprises:

in response to a data amount of the first data that is not recovered by the spare disk exceeding a first threshold data amount, reconstructing the disk array using the first disk; and in response to a data amount of the first data that is not recovered by the spare disk being smaller than the first threshold data amount, reconstructing the disk array using the spare disk.

15. The device according to claim 13, wherein in response to the difference value being greater than the second threshold data amount, reconstructing the disk array using the spare disk further comprises:

ceasing recording of information related to the second data.

16. The device according to claim 13, wherein the second threshold data amount is determined based at least in part on a disk type of the disk array.

17. A computer program product for managing a storage system, the computer program product comprising:

a non-transitory computer readable medium encoded with computer-executable program code, the code configured to enable the execution of:

in response to a first disk in a disk array of the storage system returning from a failed state to a normal state, determining information of a spare disk for recovering first data stored on the first disk; and determining, based at least in part on the information of the spare disk, a disk from the spare disk and the first disk for reconstructing the disk array;

wherein determining, based at least in part on the information of the spare disk, a disk from the spare disk and the first disk for reconstructing the disk array comprises:

in response to a data amount of the first data that is not recovered by the spare disk exceeding a first threshold data amount, reconstructing the disk array using the first disk; and in response to a data amount of the first data that is not recovered by the spare disk being smaller than the first threshold data amount, reconstructing the disk array using the spare disk.

18. The computer program product of claim 17, wherein determining information of the spare disk for recovering data associated with the first disk comprises: determining at least one of the following:

a data amount of the first data that has been recovered by the spare disk;

a data amount of the first data that is not recovered by the spare disk;

a proportion of data that has been recovered by the spare disk to the first data;

a proportion of data that is not recovered by the spare disk to the first data; and a disk type of the spare disk.

19. The computer program product of claim 17, wherein the code is further configured to enable the execution of:

recording information related to second data, the second data being data written into the disk array during a period from the first disk entering the failed state to returning to the normal state.

20. The computer program product according to claim 17, wherein the data amount of the first data that is not recovered by the spare disk exceeds the first threshold data amount; and wherein the code is further configured to enable the execution of:

labeling the spare disk as a new disk of the disk array;

prior to reconstructing the disk array using the first disk, recovering a portion of the first data in storage space of the new disk;

in response to reconstructing the disk array using the first disk, releasing the storage space of the new disk; and relabeling the new disk as the spare disk.

21. A computer program product for managing a storage system, the computer program product comprising:

a non-transitory computer readable medium encoded with computer-executable program code, the code configured to enable the execution of:

in response to a first disk in a disk array of the storage system returning from a failed state to a normal state, determining information of a spare disk for recovering first data stored on the first disk; and determining, based at least in part on the information of the spare disk, a disk from the spare disk and the first disk for reconstructing the disk array;

recording information related to second data, the second data being data written into the disk array during a period from the first disk entering the failed state to returning to the normal state;

wherein determining, based at least in part on the information of the spare disk, the disk from the spare disk and the first disk for reconstructing the disk array comprises:

determining a data amount associated with the first disk from the information related to the second data;

determining a difference value between a data amount of the first data that is not recovered by the spare disk and a data amount associated with the first disk;

in response to the difference value being greater than a second threshold data amount, reconstructing the disk array using the first disk; and in response to the difference value being smaller than the second threshold data amount, reconstructing the disk array using the spare disk.

22. The computer program product of claim 21, wherein determining, based at least in part on the information of the spare disk, a disk from the spare disk and the first disk for reconstructing the disk array comprises:

in response to a data amount of the first data that is not recovered by the spare disk exceeding a first threshold data amount, reconstructing the disk array using the first disk; and in response to a data amount of the first data that is not recovered by the spare disk being smaller than the first threshold data amount, reconstructing the disk array using the spare disk.

23. The computer program product of claim 21, wherein in response to the difference value being greater than the second threshold data amount, reconstructing the disk array using the spare disk further comprises:

ceasing recording of information related to the second data.

* * * * *